(12) United States Patent
Tiemeyer

(10) Patent No.: US 12,441,159 B2
(45) Date of Patent: Oct. 14, 2025

(54) THERMAL MANAGEMENT SYSTEM FOR A VEHICLE AND METHOD FOR OPERATING A THERMAL MANAGEMENT SYSTEM

(71) Applicant: HELLA GmbH & Co. KGaA, Lippstadt (DE)

(72) Inventor: Sebastian Tiemeyer, Dortmund (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 224 days.

(21) Appl. No.: 18/207,463

(22) Filed: Jun. 8, 2023

(65) Prior Publication Data
US 2023/0311616 A1  Oct. 5, 2023

Related U.S. Application Data

(63) Continuation of application No. PCT/EP2021/061156, filed on Apr. 28, 2021.

(30) Foreign Application Priority Data

Dec. 9, 2020 (DE) ...................... 10 2020 132 790.0

(51) Int. Cl.
B60H 1/00 (2006.01)

(52) U.S. Cl.
CPC ..... B60H 1/00885 (2013.01); B60H 1/00278 (2013.01); B60H 1/00392 (2013.01); B60H 1/00485 (2013.01); B60H 2001/00307 (2013.01)

(58) Field of Classification Search
CPC ............ B60H 1/00885; B60H 1/00278; B60H 1/00398; B60H 1/00392; B60H 1/00485; B60H 2001/00307
See application file for complete search history.

(56) References Cited

U.S. PATENT DOCUMENTS

| 9,827,824 B2 | 11/2017 | Enomoto et al. |
| 10,343,484 B2 | 7/2019 | Cheng |

(Continued)

FOREIGN PATENT DOCUMENTS

| DE | 112013004227 T5 | 6/2015 |
| EP | 3069910 A2 | 9/2016 |

OTHER PUBLICATIONS

International Search Report dated Sep. 6, 2021 in corresponding application PCT/EP2021/061156.

*Primary Examiner* — Nelson J Nieves
(74) *Attorney, Agent, or Firm* — Muncy, Geissler, Olds & Lowe, P.C.

(57) ABSTRACT

A thermal management system for a vehicle, comprising a controller, a first coolant circuit with a first coolant pump, a second coolant circuit with a second coolant pump, and a multiway valve that completes each of the coolant circuits. The first coolant pump, the second coolant pump, and the multiway valve can be automatically actuated by the controller. The first coolant circuit and the second coolant circuit can be fluidically connected to one another by the multiway valve as a function of the actuation of the multiway valve. The first coolant pump, the second coolant pump, and the multiway valve are matched to one another such and can be operated such that a coolant circulates essentially in the first coolant circuit when the first coolant pump is switched on and when the second coolant pump is switched off.

13 Claims, 2 Drawing Sheets

(56) References Cited

U.S. PATENT DOCUMENTS

| | | | |
|---|---|---|---|
| 2019/0143783 A1* | 5/2019 | He | B60H 1/00885 |
| | | | 62/498 |
| 2019/0176563 A1* | 6/2019 | Kim | B60H 1/00885 |
| 2020/0009941 A1* | 1/2020 | Aikawa | B60H 1/06 |
| 2020/0171914 A1* | 6/2020 | Han | B60H 1/00278 |
| 2021/0387505 A1* | 12/2021 | Kim | B60H 1/2221 |
| 2022/0016955 A1* | 1/2022 | Kim | B60H 1/03 |
| 2022/0134839 A1* | 5/2022 | He | B60H 1/00485 |
| | | | 165/203 |
| 2022/0281285 A1* | 9/2022 | Kim | B60H 1/00278 |
| 2023/0123676 A1* | 4/2023 | Tiemeyer | B60H 1/00885 |
| | | | 62/244 |
| 2024/0246396 A1* | 7/2024 | Jeong | B60H 1/00885 |
| 2024/0300332 A1* | 9/2024 | Suzuki | H01M 10/663 |
| 2024/0408934 A1* | 12/2024 | Kuepper | B60H 1/00278 |
| 2025/0018786 A1* | 1/2025 | Tiemeyer | H01M 10/613 |

* cited by examiner

THERMAL MANAGEMENT SYSTEM FOR A VEHICLE AND METHOD FOR OPERATING A THERMAL MANAGEMENT SYSTEM

This nonprovisional application is a continuation of International Application No PCT/EP2021/061156, which was filed on Apr. 28, 2021, and which claims priority to German Patent Application No 10 2020 132 790.0, which was filed in Germany on Dec. 9, 2020, and which are both herein incorporated by reference.

BACKGROUND OF THE INVENTION

Field of the Invention

The present invention relates to a thermal management system for a vehicle and a method for operating a thermal management system.

Description of the Background Art

Such thermal management systems for vehicles, for instance electric vehicles, and methods for their operation, are already known from the prior art in numerous embodiments, and comprise, for example, a controller, a battery circuit connected in a heat-transferring manner to a traction battery of the electric vehicle, a drive circuit connected in a heat-transferring manner to an electric drive of the electric vehicle and/or to power electronics for an electric drive, and a climate control circuit connected in a heat-transferring manner to a passenger compartment of the electric vehicle, wherein, firstly, the battery circuit and the drive circuit can each be operated with a coolant and can be connected to or disconnected from one another in a coolant-conducting manner by means of at least one actuatable coolant valve, and secondly, the climate control circuit can be operated with a refrigerant that is different from the coolant.

This is the starting point for the present invention.

SUMMARY OF THE INVENTION

It is therefore an object of the present invention to improve a thermal management system for a vehicle and a method for operating the same.

This object is attained in an exemplary embodiment by a thermal management system for a vehicle, which is characterized in that a first coolant pump, a second coolant pump, and a multiway valve are matched to one another in such a way and can be operated in such a way that a coolant circulates essentially in the first coolant circuit when the first coolant pump is switched on and when the second coolant pump is switched off, and such that, when the first coolant pump is switched on and when the second coolant pump is switched on, the coolant circulates in the first coolant circuit and in the second coolant circuit fluidically connected to the first coolant circuit by means of the multiway valve. The terms "controller" and "can be actuated" may be interpreted broadly according to the invention and also encompass closed-loop control systems or combinations of an open-loop and a closed-loop control system. Furthermore, this problem is solved by a method for operating a thermal management system.

An important advantage of the invention is, for example, that a thermal management system for a vehicle and a method for operating the same are improved. On account of the design according to the invention of the thermal management system and of the method for operating the same, thermal management in a vehicle, for example an electric vehicle, can be implemented in a manner that is simple in terms of design and manufacturing. Furthermore, a compact and thus space-saving construction is made possible by this means since fewer components, in particular fewer valves, must be incorporated, for example. Accordingly, logistics and stockkeeping are simplified as well.

In principle, the thermal management system for a vehicle according to the invention can be freely chosen within broad suitable limits in terms of type, mode of operation, material, and dimensioning.

An advantageous improvement of the thermal management system for a vehicle according to the invention provides that the aforementioned circulation of the coolant essentially only in the first coolant circuit and/or the aforementioned circulation of the coolant in the first and the second coolant circuit is accomplished in each case solely through the automatic control of the first coolant pump, the second coolant pump, and the multiway valve. The thermal management system according to the invention is further simplified by this means.

Another advantageous improvement of the thermal management system according to the invention provides that the first coolant circuit has a first flow section and a second flow section arranged parallel to the first flow section in fluid dynamic terms, wherein the first flow section and the second flow section are fluidically connected to one another in every operating state of the thermal management system, and wherein the first flow section can be fluidically connected directly to the second coolant circuit by means of the multiway valve, and the second flow section can be fluidically connected directly to the first coolant pump by means of the multiway valve. In this way, the thermal management system according to the invention can be employed even more flexibly in its application. This is because the first and second flow sections can be implemented differently from one another and the coolant is routed either through the first flow section and/or through the second flow section depending on the requirements of the individual case.

The multiway valve can have a first connecting passage, with a first valve port, corresponding to the first flow section and the second coolant circuit, and has a second connecting passage, with a second valve port, corresponding to the second flow section and the first coolant pump, preferably that the first and the second valve ports are arranged one above the other on the multiway valve. As a result, the respective fluidic connection can be implemented in a manner that is especially simple in terms of design and manufacturing. This applies, in particular, to the preferred embodiment of this improvement.

A volume flow rate of the coolant through the second flow section can decrease, preferable, decreases steadily, and a volume flow rate of the coolant through the first flow section increases, preferably increases steadily, when the first coolant pump is switched on and when the second coolant pump is switched on with constant pump pressure of the first coolant pump and with increasing pump pressure of the second coolant pump, preferably linearly increasing pump pressure of the second coolant pump. In this way, a desired proportional division of the coolant between the first flow section and the second flow section, for example, can be implemented in a very simple manner in terms of switching and actuation. This applies especially to the preferred embodiment of this improvement.

A volume flow rate of the coolant through the second flow section can decrease, preferably decreases steadily, and a volume flow rate of the coolant through the first flow section increases, preferably increases steadily, when the first coolant pump is switched on and when the second coolant pump is switched on with constant pump pressure of the first coolant pump and with increasing pump pressure of the second coolant pump, preferably linearly increasing pump pressure of the second coolant pump.

As the pump pressure of the first coolant pump decreases, the volume flow rate of the coolant through the second flow section additionally decreases in comparison with a constant pump pressure of the first coolant pump. An additional degree of freedom in the division of the coolant between the first and the second flow sections is provided by this means so that the coolant can be divided even more flexibly between the first and the second flow sections.

Further, as the pump pressure of the first coolant pump decreases, the volume flow rate of the coolant through the second flow section additionally decreases in comparison with a constant pump pressure of the first coolant pump.

The first coolant circuit can be designed as a drive circuit connected in a heat-transferring manner to an electric drive of the electric vehicle and/or to power electronics for an electric drive, and the second coolant circuit is designed as a battery circuit connected in a heat-transferring manner to a traction battery of a vehicle designed as an electric vehicle. The invention can be employed to very good advantage, specifically with electric vehicles. This applies, in particular, to the aforementioned embodiment of the first and the second coolant circuits.

An air cooler, for example, can be connected in a heat-transferring manner to an open environment and can be arranged in the second flow section of the first coolant circuit. An efficient cooling of the thermal management system according to the invention is made possible in this way along with little effort for design, manufacturing, and switching. This applies, in particular, to the preferred embodiment of this improvement.

The thermal management system can additionally have a climate control circuit connected in a heat-transferring manner to a passenger compartment of the vehicle, wherein the climate control circuit can be connected in a heat-transferring manner to the first and/or the second coolant circuit. As a result, the waste heat from the first and/or the second coolant circuit can be used to good advantage for a climate control of the passenger compartment. Accordingly, the total energy consumption of the vehicle can be reduced significantly. For example, the aforementioned heat-transferring connection can be implemented by means of shared components of the first and/or second coolant circuit on the one hand and of the climate control circuit on the other hand. Alternatively or in addition, it is possible that the climate control circuit can be fluidically connected to the first and/or the second coolant circuit by means of the multiway valve.

The climate control circuit can be fluidically connected to the first flow section by means of the multiway valve. In this way, the first coolant circuit, the second coolant circuit, and the climate control circuit of the thermal management system according to the invention can be fluidically connected to a single, common coolant circuit by means of the multiway valve.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
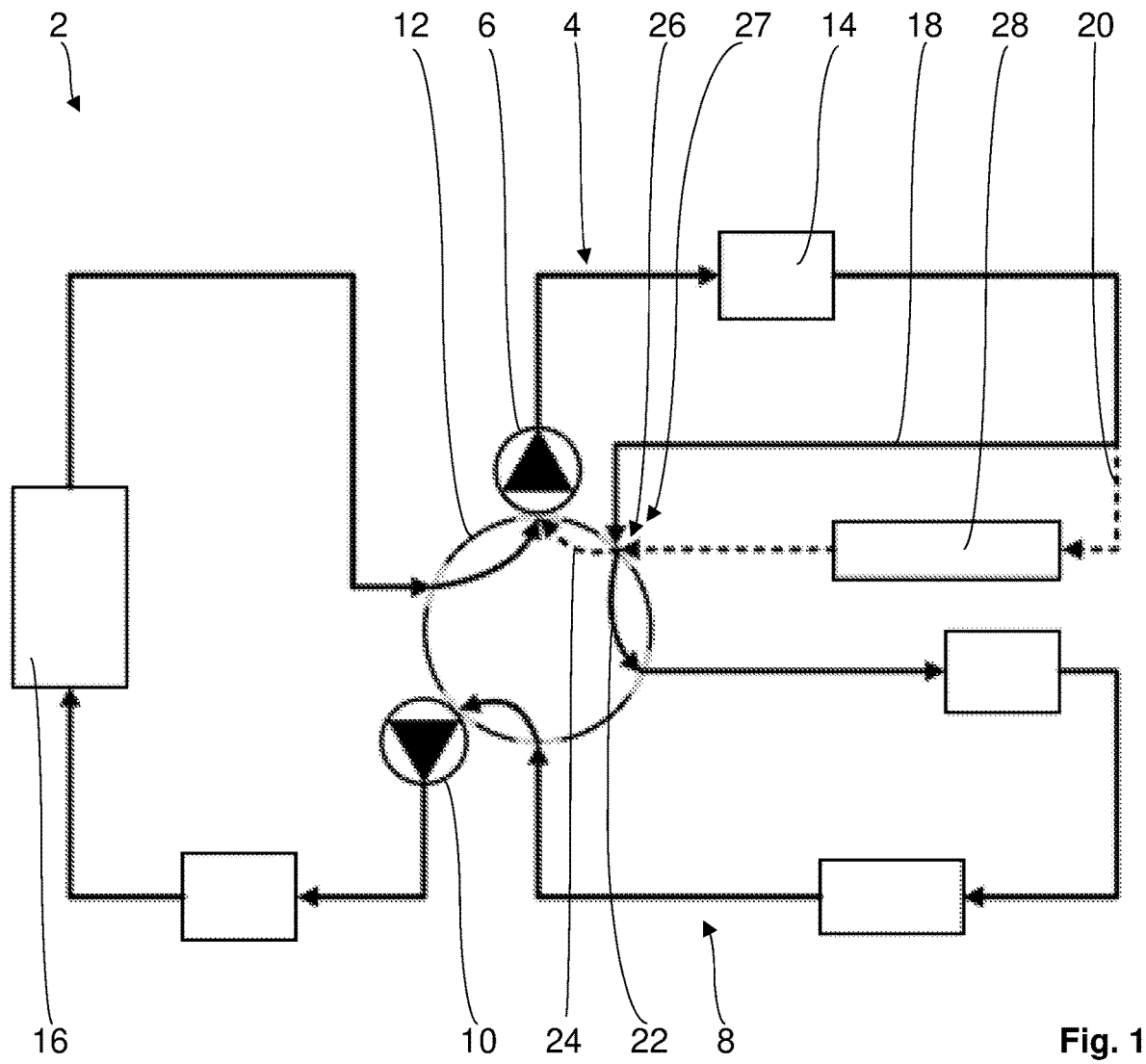
FIG. 1 is an example of a thermal management system for a vehicle according to the invention for carrying out the method according to the invention, in a process block diagram.

In FIG. 1, a thermal management system for a vehicle according to the invention is shown strictly by way of example. The thermal management system 2 is designed for an electric vehicle, and comprises a controller, a first coolant circuit 4 with a first coolant pump 6, a second coolant circuit 8 with a second coolant pump 10, and a multiway valve 12 that completes both the first and the second coolant circuits 4, 8, wherein the first coolant pump 6, the second coolant pump 10, and the multiway valve 12 can be automatically actuated by means of the controller, and wherein the first coolant circuit 4 and the second coolant circuit 8 can be fluidically connected to one another by means of the multiway valve 12 as a function of the actuation of the multiway valve 12.

In the present exemplary embodiment, the first coolant circuit 4 is designed as a drive circuit connected in a heat-transferring manner to an electric drive of the electric vehicle and to power electronics for the electric drive, and the second coolant circuit 8 is designed as a battery circuit connected in a heat-transferring manner to a traction battery 16 of the vehicle designed as an electric vehicle. The aforementioned electric drive and the aforementioned power electronics are represented here as one common symbol 14. Furthermore, the thermal management system 2 here additionally has a climate control circuit connected in a heat-transferring manner to a passenger compartment of the vehicle, wherein the climate control circuit can be connected in a heat-transferring manner to the first coolant circuit 4 and/or to the second coolant circuit 8.

According to the invention, the first coolant pump 6, the second coolant pump 10, and the multiway valve 12 are matched to one another in such a way and can be operated in such a way that a coolant circulates essentially in the first coolant circuit 4 when the first coolant pump 6 is switched on and when the second coolant pump 10 is switched off, and such that, when the first coolant pump 6 is switched on and when the second coolant pump 10 is switched on, the coolant circulates in the first coolant circuit 4 and in the second coolant circuit 8 fluidically connected to the first coolant circuit 4 by means of the multiway valve 12. The aforementioned circulation of the coolant essentially only in the first coolant circuit 4 and the aforementioned circulation of the coolant in the first and the second coolant circuits 4, 8 are each accomplished in the present exemplary embodiment solely through the automatic control of the first coolant pump 6, the second coolant pump 10, and the multiway valve 12. This will be explained in detail below.

Furthermore, the first coolant circuit 4 has a first flow section 18 and a second flow section 20 arranged parallel to the first flow section 18 in fluid dynamic terms, wherein the first flow section 18 and the second flow section 20 are fluidically connected to one another in every operating state of the thermal management system 2, and wherein the first flow section 18 can be fluidically connected directly to the second coolant circuit 8 by means of the multiway valve 12, and the second flow section 20 can be fluidically connected directly to the first coolant pump 6 by means of the multiway valve 12. The second flow section 20 is shown in dashed lines in FIG. 1 for the sake of clarity.

The multiway valve 12 has a first connecting passage 22, with a first valve port 26, corresponding to the first flow section 18 and the second coolant circuit 8, and has a second connecting passage 24, with a second valve port 27, corresponding to the second flow section 20 and the first coolant pump 6, wherein the first and the second valve ports 26, 27 are arranged one above the other on the multiway valve 12. An air cooler 28, namely a radiator, that is connected in a heat-transferring manner to an open environment is arranged in the second flow section 20 of the first coolant circuit 4.

Figure 2:
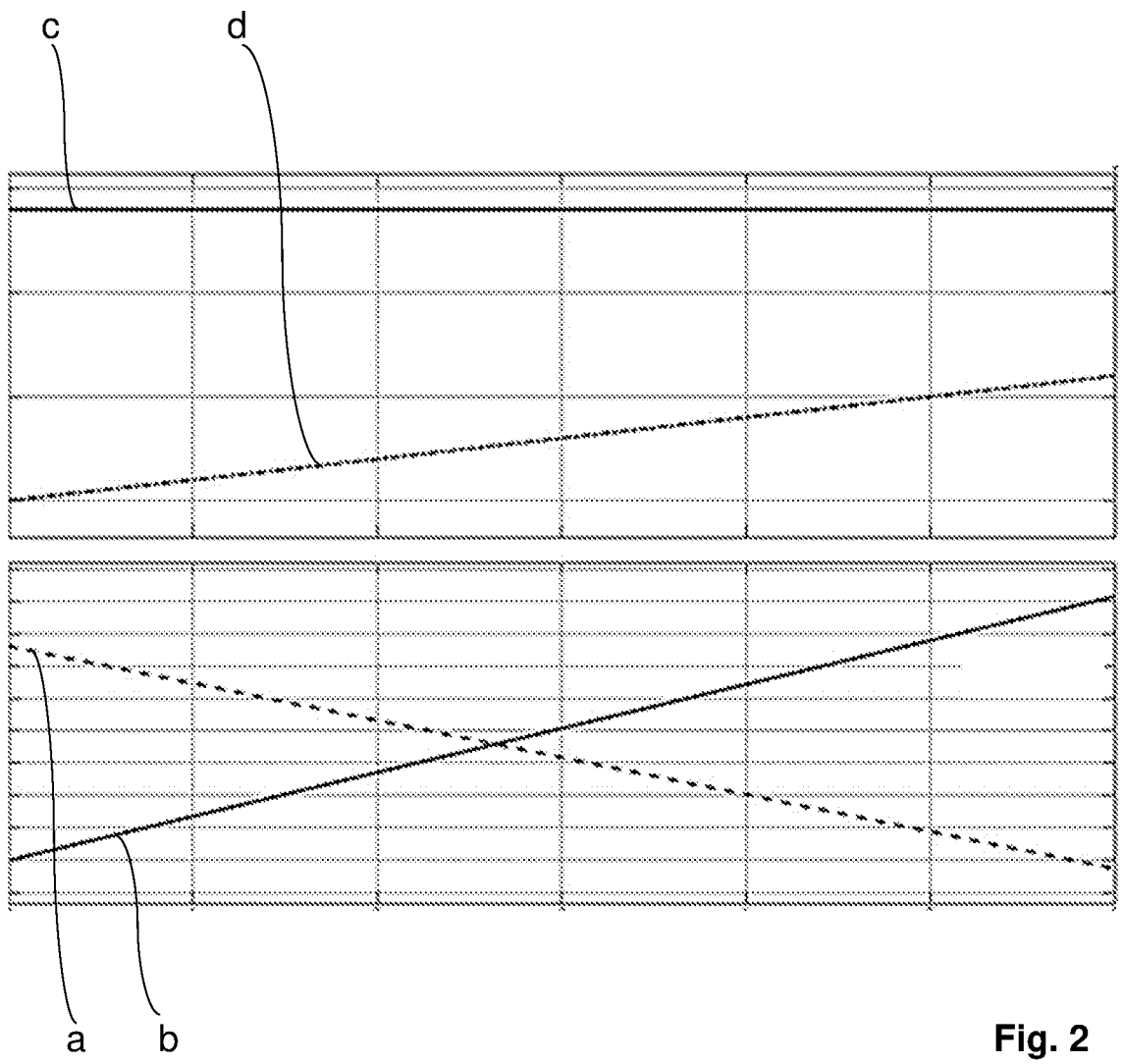
FIG. 2 is a diagram for the example from FIG. 1, in which the volume flow rate through the first and the second flow sections is represented as a function of the pump pressure of the first and second coolant pumps.

When the first coolant pump 6 is switched on and when the second coolant pump 10 is switched on with constant pump pressure of the first coolant pump 6 and with increasing pump pressure of the second coolant pump 10, namely linearly increasing pump pressure of the second coolant pump 10, a volume flow rate of the coolant through the second flow section 20 decreases, namely steadily, and a volume flow rate of the coolant through the first flow section 18 increases, namely steadily. See FIG. 2 in this regard. In FIG. 2, the volume flow rate through the second flow section 20 is plotted as a function of time as a dashed line a in a graph located on the bottom in the image plane in FIG. 2. The solid line b in this graph is the volume flow rate through the first flow section 18. Located in the image plane in FIG. 2 above the aforementioned graph is a graph corresponding thereto, in which the respective pump pressures of the first and of the second coolant pumps 6, 10 are likewise plotted as a function of time. The pump pressure of the first coolant pump 6 is represented as a solid line c, and the pump pressure of the second coolant pump 10 is represented as a dot-and-dash line d.

The mode of operation of the thermal management system according to the invention and the method according to the invention in accordance with the present exemplary embodiment is explained in detail below on the basis of FIGS. 1 and 2.

When the first coolant pump 6 is switched on and when the second coolant pump 10 is switched off, the coolant circulates essentially in the first coolant circuit 4, namely through the second flow section 20 and thus through the air cooler 28 designed as a radiator. This is the case because the flow resistance in the first coolant circuit 4 via the second flow section 20 is significantly lower, despite the air cooler 28, in comparison with the first and second coolant circuits 4, 8 that are interconnected fluid dynamically by means of the multiway valve 12. Thus, starting from the first coolant pump 6, the coolant flows through the first coolant circuit 4 in a direct path back to the first coolant pump 6 via the second flow section 20 and the air cooler 28 arranged therein by means of the second valve port 27 and the second connecting passage 24 of the multiway valve 12. In this regard, see also FIG. 2, at the far left of each of the top and bottom graphs. With a constant pump pressure of the first coolant pump 6, the coolant flows essentially through the second flow section 20. Only a small residual quantity of coolant flows through the first flow section 18. The aforementioned circulation of the coolant in this case is accomplished solely through the automatic control of the first coolant pump 6, the second coolant pump 10, and the multiway valve 12. No additional valves or the like are required for this purpose.

With the aforementioned flow through the first coolant circuit 4, the coolant comes into heat-transferring connection with the electric drive and the power electronics 14 corresponding thereto. Accordingly, the electric drive and the power electronics 14 can be cooled by means of the coolant, wherein the heat absorbed by the coolant is subsequently emitted to the open environment through the air cooler 28 designed as a radiator.

In contrast thereto, when the first coolant pump 6 is switched on and when the second coolant pump 10 is switched on, the coolant circulates in the first coolant circuit 4 and in the second coolant circuit 8 fluidically connected to the first coolant circuit 4 by means of the multiway valve 12. Thus, starting from the first coolant pump 6, the coolant flows via the first flow section 18 through the first coolant circuit 4, then initially into the second coolant circuit 8 by means of the first valve port 26 and the first connecting passage 22 of the multiway valve 12, and then is pumped in the second coolant circuit 8 by means of the second coolant pump 10, and finally is returned to the first coolant pump 6 again by means of the multiway valve 12. In this regard, see also the top and bottom graphs in FIG. 2, in each case the entire graph with the exception of the far left. With a constant pump pressure of the first coolant pump 6 and a linearly increasing pump pressure of the second coolant pump 10 over time, the volume flow rate of the coolant through the second flow section 20 decreases continuously, namely linearly, whereas the volume flow rate of the coolant through the first flow section 18 increases continuously, namely linearly. The aforementioned circulation of the coolant in this case is again accomplished solely through the automatic control of the first coolant pump 6, the second coolant pump 10, and the multiway valve 12. In this case as well, no additional valves or the like are required for this purpose.

With the aforementioned flow through the first coolant circuit 4 and the second coolant circuit 8, the coolant firstly comes into heat-transferring connection with the electric drive and the power electronics 14 corresponding thereto and secondly comes into heat-transferring connection with the traction battery 16. Accordingly, the electric drive and the power electronics 14 can be cooled by means of the coolant, wherein the heat absorbed by the coolant can subsequently be used to heat the traction battery 16. The degree of cooling of the thermal management system 2 by means of the air cooler 28 and the degree of heating of the traction battery 16 can be adjusted depending on what proportional division of the volume flow rate of the coolant takes place between the first and second flow sections 18, 20. See FIG. 2 once again in this regard. Since the first and/or the second coolant circuit 4, 8 in the present exemplary embodiment can additionally be connected in a heat-transferring manner to the climate control circuit, it is furthermore possible to alternatively or additionally use the heat from the thermal management system 2 for heating the passenger compartment.

On account of the design according to the invention of the thermal management system and of the method for operating the same, thermal management 2 in the electric vehicle is implemented in a manner that is simple in terms of design and manufacturing. Furthermore, a compact and thus space-saving construction is made possible by this means since fewer components, in particular fewer valves, must be incorporated, for example. Accordingly, logistics and stock-keeping are simplified as well.

The invention is not limited to the present exemplary embodiment. For example, the invention can also be used to good advantage with other electric vehicles. The electric vehicle can, in particular, be a motor vehicle for road traffic. Furthermore, the electric vehicle can be freely chosen within broad suitable limits and can be designed, for example, as a vehicle with only an electric drive or as a vehicle with a so-called hybrid drive, which is to say an electric drive and a combustion engine.

In particular, the invention is not restricted to the design, manufacturing, and switching details of the present exemplary embodiment. For example, the pump pressure of the first coolant pump can also be varied automatically by means of the controller alternatively or in addition to the pump pressure of the second coolant pump. As the pump pressure of the first coolant pump decreases, the volume flow rate of the coolant through the second flow section additionally decreases in comparison with a constant pump pressure of the first coolant pump. Accordingly, the method according to the invention can provide, in other embodiments of the invention, that as the pump pressure of the first coolant pump decreases, the volume flow rate of the coolant through the second flow section additionally decreases in comparison with a constant pump pressure of the first coolant pump.

The invention being thus described, it will not be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A thermal management system for a vehicle, the system comprising:
    a controller;
    a first coolant circuit with a first coolant pump;
    a second coolant circuit with a second coolant pump; and
    a multiway valve that completes both the first and the second coolant circuits,
    wherein the first coolant pump, the second coolant pump, and the multiway valve are adapted to be automatically actuated via the controller,
    wherein the first coolant circuit and the second coolant circuit are adapted to be fluidically connected to one another via the multiway valve as a function of the actuation of the multiway valve,
    wherein the first coolant pump, the second coolant pump, and the multiway valve are matched to one another and adapted to be operated such that a coolant circulates essentially in the first coolant circuit when the first coolant pump is switched on and when the second coolant pump is switched off,
    wherein, when the first coolant pump is switched on and when the second coolant pump is switched on, the coolant circulates in the first coolant circuit and in the second coolant circuit that is fluidically connected to the first coolant circuit via the multiway valve, and
    wherein the first coolant circuit has a first flow section and a second flow section arranged parallel to the first flow section in fluid dynamic terms, wherein the first flow section and the second flow section are fluidically connected to one another in every operating state of the thermal management system, and wherein the first flow section is adapted to be fluidically connected directly to the second coolant circuit via the multiway valve, and wherein the second flow section is adapted to be fluidically connected directly to the first coolant pump via the multiway valve.

2. The thermal management system according to claim 1, wherein the multiway valve has a first connecting passage with a first valve port corresponding to the first flow section and the second coolant circuit, and has a second connecting passage with a second valve port corresponding to the second flow section and the first coolant pump, and wherein the first and the second valve ports are arranged one above the other on the multiway valve.

3. The thermal management system according to claim 1, wherein a volume flow rate of the coolant through the second flow section decreases or decreases steadily, and a volume flow rate of the coolant through the first flow section increases or increases steadily when the first coolant pump is switched on and when the second coolant pump is switched on with constant pump pressure of the first coolant pump and with increasing pump pressure of the second coolant pump or linearly increasing pump pressure of the second coolant pump.

4. The thermal management system according to claim 3, wherein, as the pump pressure of the first coolant pump decreases, the volume flow rate of the coolant through the second flow section additionally decreases in comparison with a constant pump pressure of the first coolant pump.

5. The thermal management system according to claim 1, wherein an air cooler or a radiator that is connected in a heat-transferring manner to an open environment is arranged in the second flow section of the first coolant circuit.

6. The thermal management system according to claim 1, wherein the thermal management system further comprises a climate control circuit connected in a heat-transferring manner to a passenger compartment of the vehicle, and wherein the climate control circuit is connectable in a heat-transferring manner to the first and/or the second coolant circuit.

7. The thermal management system according to claim 6, wherein the climate control circuit is adapted to be fluidically connected to the first flow section via the multiway valve.

8. A thermal management system for a vehicle, the system comprising:
    a controller;
    a first coolant circuit with a first coolant pump;
    a second coolant circuit with a second coolant pump; and
    a multiway valve that completes both the first and the second coolant circuits,
    wherein the first coolant pump, the second coolant pump, and the multiway valve are adapted to be automatically actuated via the controller,
    wherein the first coolant circuit and the second coolant circuit are adapted to be fluidically connected to one another via the multiway valve as a function of the actuation of the multiway valve,
    wherein the first coolant pump, the second coolant pump, and the multiway valve are matched to one another and adapted to be operated such that a coolant circulates essentially only in the first coolant circuit when the first coolant pump is switched on and when the second coolant pump is switched off, and
    wherein, when the first coolant pump is switched on and when the second coolant pump is switched on, the coolant circulates in the first coolant circuit and in the second coolant circuit that is fluidically connected to the first coolant circuit via the multiway valve.

9. The thermal management system according to claim 8, wherein the circulation of the coolant essentially only in the first coolant circuit and/or the circulation of the coolant in the first and the second coolant circuit is accomplished solely through an automatic control of the first coolant pump, the second coolant pump, and the multiway valve.

10. The thermal management system according to claim 8, wherein the first coolant circuit is designed as a drive circuit connected in a heat-transferring manner to an electric drive of the electric vehicle and/or to power electronics for an electric drive, and wherein the second coolant circuit is designed as a battery circuit connected in a heat-transferring manner to a battery or traction battery of a vehicle designed as an electric vehicle.

11. A method for operating a thermal management system according to claim 8, the method comprising:
switching the first coolant pump on and switching the second coolant pump off to facilitate a coolant to circulate essentially only in the first coolant circuit; and
switching the first coolant pump on and switching the second coolant pump on to facilitate the coolant to circulate in the first coolant circuit and in the second coolant circuit that is fluidically connected to the first coolant circuit via the multiway valve,
wherein the circulation of the coolant essentially only in the first coolant circuit and/or the circulation of the coolant in the first and the second coolant circuits is accomplished in each case solely through an automatic control of the first coolant pump, the second coolant pump, and the multiway valve.

12. The method according to claim 11, wherein a volume flow rate of the coolant through the second flow section decreases or decreases steadily, and a volume flow rate of the coolant through the first flow section increases or increases steadily when the first coolant pump is switched on and when the second coolant pump is switched on with constant pump pressure of the first coolant pump and with increasing pump pressure of the second coolant pump or linearly increasing pump pressure of the second coolant pump.

13. The method according to claim 12, wherein, as the pump pressure of the first coolant pump decreases, the volume flow rate of the coolant through the second flow section additionally decreases in comparison with a constant pump pressure of the first coolant pump.

\* \* \* \* \*